(12) United States Patent
Ferlin

(10) Patent No.: US 7,172,000 B2
(45) Date of Patent: Feb. 6, 2007

(54) CROWN REINFORCEMENT WITH SHOULDER PLY

(75) Inventor: Olivier Ferlin, Marsat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 103 days.

(21) Appl. No.: 10/932,041

(22) Filed: Sep. 2, 2004

(65) Prior Publication Data

US 2005/0067080 A1 Mar. 31, 2005

Related U.S. Application Data

(63) Continuation of application No. PCT/EP03/02179, filed on Mar. 4, 2003.

(30) Foreign Application Priority Data

Mar. 4, 2002 (FR) .................................. 02 02736

(51) Int. Cl.
*B60C 23/18* (2006.01)
*B60C 9/20* (2006.01)
*B60C 15/06* (2006.01)

(52) U.S. Cl. ...................... 152/153; 152/527; 152/534; 152/543; 152/555

(58) Field of Classification Search ................ 152/153, 152/527, 534, 535, 543, 555
See application file for complete search history.

(56) References Cited

U.S. PATENT DOCUMENTS 3,195,604 A * 7/1965 Boussu et al. .............. 152/535
3,506,052 A 4/1970 Wittneben
3,735,790 A * 5/1973 Bertrand
3,789,898 A * 2/1974 Montagne ................ 152/535 X
4,172,487 A * 10/1979 Suzuki et al. ................ 152/527

(Continued)

FOREIGN PATENT DOCUMENTS

EP 0 038 019 10/1981

(Continued)

OTHER PUBLICATIONS

English translation of European Patent Application 0 845 373 A1, Jun. 3, 1998, Continental AG.*

(Continued)

*Primary Examiner*—Adrienne C. Johnstone
(74) *Attorney, Agent, or Firm*—Buchanan Ingersoll & Rooney PC

(57) ABSTRACT

A tire intended to be fitted on a vehicle bearing a heavy load, such as a lorry, construction vehicle and/or aircraft, which tire comprises a carcass reinforcement radially surmounted by a crown reinforcement and a tread. The crown reinforcement is composed of at least two plies of metallic reinforcement elements, which are parallel to each other within the respective ply and are crossed from one ply to the next, forming angles of between 10 and 35° with the circumferential direction. Disposed in each shoulder is an additional ply of reinforcement elements which are parallel to each other in the ply and are oriented radially. The axially inner edges of the additional shoulder ply are radially adjacent to at least one edge of one of the plies of the crown reinforcement. The axially outer edge of the additional shoulder ply is radially lower than the edge of the ply to which the additional shoulder ply is adjacent.

11 Claims, 2 Drawing Sheets

U.S. PATENT DOCUMENTS

| | | | |
|---|---|---|---|
| 4,235,274 A * | 11/1980 | Suzuki et al. | 152/527 |
| 4,287,924 A * | 9/1981 | Deck et al. | 152/153 |
| 4,696,335 A | 9/1987 | Tsukagoshi et al. | |
| 4,819,705 A * | 4/1989 | Caretta | 152/527 |
| H001333 H * | 7/1994 | Helfer et al. | 152/527 X |
| 5,830,295 A * | 11/1998 | Hobbs et al. | 152/527 |
| 5,858,137 A * | 1/1999 | Assaad et al. | 152/527 |
| 6,253,816 B1 * | 7/2001 | Ide | 152/527 |
| 6,959,746 B2 * | 11/2005 | Shimizu | 152/534 |

FOREIGN PATENT DOCUMENTS

| | | |
|---|---|---|
| EP | 0 845 373 | 6/1998 |
| FR | 2 066 777 | 8/1971 |
| JP | 07323703 A * | 12/1995 |
| JP | 09207518 A * | 8/1997 |
| JP | 10138708 A * | 5/1998 |
| WO | WO 02/07460 A1 * | 9/2002 |

OTHER PUBLICATIONS

Abstract of JP 10-138708 A, May 26, 1998, Bridgestone Corporation.

* cited by examiner

CROWN REINFORCEMENT WITH SHOULDER PLY

This application is a continuation of PCT/EP03/02179 filed on Mar. 4, 2003 and which claims priority from Patent Application Serial No. 02/02736 filed in France on Mar. 4, 2002, the entire contents of which are hereby incorporated by reference.

The invention relates to a tire intended to be fitted on a vehicle bearing a heavy load, such as a lorry, construction vehicle and/or aircraft, which tire comprises a carcass reinforcement radially surmounted by a crown reinforcement and a tread.

BACKGROUND OF THE INVENTION

Such tires are subjected to repeated stresses and deformation which result in external stresses in the tire which are taken up by the various reinforcements and in particular by working plies of the crown reinforcement. These working plies usually comprise reinforcements positioned parallel to one another in one and the same ply and laid at an angle such that they cross with those of the adjacent working ply.

The function of the working plies is in particular to impart rigidity to the tire. These plies in known manner have at their ends fragile zones due to the free ends of the reinforcement elements.

It is known, in order to avoid contact between the ends of the cords of the various plies, to put in place a thickness of rubber mix which makes it possible to space apart and to decouple said free ends of the reinforcement elements of a ply from those of the adjacent ply. In the same manner, it is usual to arrange a thickness of rubber mix between the carcass ply and the end of the working ply directly positioned radially above the latter to space apart the free ends of the reinforcement elements of the working ply from those of the carcass ply. These rubber masses make it possible in particular to avoid breaks in the mixtures or cleavage for a given level of stresses.

It would appear, however, that, when using the tire and therefore following repeated deformations, incipient breaks appear in the mixture between the reinforcement elements of one and the same working ply.

Furthermore, the fact that such a tire is formed majoritarily of rubber mixes, and that it is subjected to repeated stresses and deformations, involves what may be a significant generation of heat which may result in a reduction in the life of said tire.

This phenomenon which results in an increase in temperature and risks of degradation of the tire is known and can be explained simply: the stresses exerted on the rubber mixes result in heating generated by the hysteresis of the elastomers contained in the rubber mixes. This heat generated within rubber zones cannot be evacuated sufficiently rapidly owing to the poor thermal conductivity of the polymers.

In a tire of radial type, the production of heat and the operating temperatures obtained are greatest in the regions bordering the ends of the reinforcement plies forming mainly on one hand the carcass reinforcement and on the other hand the crown reinforcement. Said temperatures, combined with high levels of stresses, have an adverse effect on the fatigue of the rubber mixes of said regions.

A reduction in said temperatures may be obtained by judicious selection of the mixtures in question: it is known that the composition of said mixtures may be selected in order to obtain hysteresis losses which are as low as possible; however, it is equally well known that these are obtained to the detriment of other properties of the same importance as a low operating temperature.

U.S. Pat. No. 4,362,200 also described the use of rubber compositions which are heat-conducting by incorporation of graphite. This choice of composition does not make it possible to avoid the generation of heat, but permits more rapid cooling of the rubber compositions. However, as previously, this choice of modification of one property of the rubber, which on one hand is very costly, on the other hand is to the detriment of other properties which are also desired.

It is furthermore known in particular from FR 1 437 569 to incorporate plies comprising reinforcement elements in the shoulders of the tires in the zones surrounding the edges of the crown reinforcement. The incorporation of such plies is intended to provide a gradual transition in terms of rigidity between the crown reinforcement, which is relatively rigid, and the carcass, which is much more flexible.

SUMMARY OF THE INVENTION

The first object of the invention is to limit the risk of degradation of the tires due to the formation of cracks between the ends of the reinforcement elements of the working plies and to the propagation thereof.

To this end, the tire according to the invention, comprising a carcass reinforcement of at least one ply of reinforcement elements which is anchored within each bead to at least one annular bead element, and a crown reinforcement composed of at least two plies of metallic reinforcement elements, which are parallel to each other within each ply and are crossed from one ply to the next, forming angles of between 10 and 35° with the circumferential direction, additionally comprises at least in each shoulder a ply of reinforcement elements, advantageously of low diameter, which are parallel to each other in the ply and are oriented radially, the axially inner edge of said additional ply being radially adjacent to at least one edge of one of the plies of the crown reinforcement, and the axially outer edge of said additional ply being radially internal to the edge of the ply to which the additional ply is adjacent.

The axial direction is defined as being the direction of the axis of rotation.

The edge of a ply is defined as a limited zone of the ply defined axially by one end of said ply.

The radial orientation of the reinforcement elements of the additional ply must be understood as being an orientation of the elements such that they form an angle of between 60 and 90° with the circumferential direction of the tire. According to a preferred embodiment of the invention best limiting the appearance of cracks between the ends of the reinforcement elements of the working plies, said angle is between 80 and 90°.

One advantageous embodiment of the invention provides for the reinforcement elements of the additional shoulder ply to be what is referred to as of low diameter, compared with the compacted diameter D of the metallic elements of the working crown plies of the tyre, when said compacted diameter is less than 0.5 times the diameter D.

More advantageously still, the compacted diameter of the reinforcement elements of the additional ply is less than 1 mm, and preferably less than 0.6 mm, and even more preferably less than 0.4 mm.

The compacted diameter is the measured diameter of a reinforcement element when the cords forming it are in contact with each other.

These diameters of the reinforcement elements of the additional ply allow the presence of said ply without said reinforcement elements and more particularly their ends being a new source of risk of degradation within the tire. Such diameters make it possible in particular to limit the flexural strength of the reinforcement elements, more particularly in the case of metallic reinforcement elements. It is thus possible to limit the rigidity gradients, in particular at the axially outer edge of the additional ply, and thus to reduce the risks of detachment of the additional ply.

Preferably, the axially outer edge of the additional ply is associated with a layer of cohesive rubber mix radially to the inside and/or to the outside of the additional ply. Such a layer of rubber mix has a protective function and makes it possible in particular to limit the rigidity gradients.

According to an advantageous variant of the invention, the axially outer edge of the additional ply is distant from the base of the bead by a distance $H_1$ less than $H_0+0.8\ H_0$, $H_0$ being the radial distance separating the line of greatest axial width of the tire from the base of the bead. According to this variant embodiment of the invention, it would appear that the additional ply which is extended at least as far as the radially upper part of the zone of the sidewall will make it possible to improve other mechanical properties of the tire.

In fact, it appears that a ply of this type produced in accordance with this variant of the invention very significantly improves the resistance of the tire to impacts affecting the shoulder.

The reinforcement elements of the additional ply may be of textile or metallic type.

According to one advantageous embodiment of the invention and more particularly in the case of an additional ply, the axially outer edge of which is located at least in the radially upper part of the zone of the sidewall and the reinforcement elements of said additional ply being metallic, it would appear that the tire according to the invention meets the other requirement mentioned previously, because a tire thus produced makes it possible to limit the risks of degradation due to the generation of heat appearing owing to the hysteresis of the elastomers without furthermore adversely affecting the other desired properties of the rubbers or more directly of the tires.

Said reinforcement elements are then, more preferably still, made of steel, steel being recognized as a very good conductor of heat, and making it possible to use a material whose use is widespread in the manufacture of tires, and which is therefore less expensive.

The tire according to the invention, by the presence of the additional plies placed at the shoulders, permits rapid evacuation of the heat produced during travel towards the outer surface of the tire, because the positioning of the additional plies makes it possible to conduct the heat towards the sidewall zones where the rubber mass is less great and therefore permits more rapid evacuation of heat even if the nature of the rubber is not more favorable to good conduction; the low thickness in fact enables the heat to be eliminated more rapidly, the path to be traveled being short from the heart of the rubber mass towards the outer surface. The tire according to the invention thus makes it possible to reduce the operating temperatures which might lead to a reduction in the life of the tires.

According to a preferred embodiment of the invention, the additional ply has its axially inner edge adjacent radially to the outside to the edge of the outermost working crown ply.

According to this embodiment of the invention, the additional ply is advantageously in contact with the rubber mix which makes it possible to decouple the free ends of the reinforcement elements of the different working plies.

Furthermore, the axially outer edge of the additional shoulder ply is for its part advantageously axially adjacent to the profiled element of rubber mix, one of the wings of which, as is known per se, provides the join between the carcass reinforcement and the edges of the radially innermost crown reinforcement plies and the other wing of which passes down into the sidewall.

According to this embodiment, the additional ply firstly makes it possible to limit the formation and propagation of cracks in the zones of the ends of the reinforcement elements and, secondly, to provide protection from the risks linked to impacts on the sidewall zones. Furthermore, the additional ply permits evacuation of the heat generated in the shoulder zone.

In the same manner and with substantially equivalent results in particular in terms of protection of the shoulder and evacuation of heat, the additional ply, according to another embodiment, may have its axially inner edge adjacent radially to the inside to the edge of the radially innermost working crown ply.

According to another advantageous embodiment of the invention, in particular when the radially outer working crown ply is narrower axially than the radially upper protective ply and consequently the decoupling rubber separates the edge of said protective ply from the radially inner working ply, the additional ply has its axially inner edge adjacent radially to the outside to the edge of the protective ply.

The tire, according to the invention, may also comprise at least one ply of metallic elements, advantageously of low diameter, within each bead, said ply having elements forming an angle of between 60 and 90° with the circumferential direction and being intended to evacuate the heat produced in the bead. The radially inner edge of said ply may be axially adjacent to the main part of the or of a carcass reinforcement ply or adjacent to the upturned part of the or of one of said carcass plies or adjacent to the radially outer edge of the or of a conventional bead reinforcement ply formed of metallic reinforcement elements inclined at a slight angle relative to the circumferential direction. The radially outer edge of said bead ply may be located at a distance $H_2$ from the base of the bead which is at least equal to 0.5 $H_0$, $H_0$ being the radial distance separating the line of greatest axial width of the tire from the base of the bead.

This embodiment of the invention which permits evacuation of the heat produced at the beads of the tire should be understood as also possibly being a variant embodiment of the invention independent of the presence of the additional plies in the shoulders such as set forth previously. The combination of all of these plies is however particularly advantageous since it permits better evacuation of the heat generated both in the regions adjoining the ends of the reinforcement plies forming mainly on one hand the carcass reinforcement and on the other hand the crown reinforcement and in the regions of the beads.

In the case of a tire which heats up greatly, the two shoulder and bead plies composed of elements of low diameter may form a single ply extending from the edge of one ply of the crown reinforcement to the bead.

BRIEF DESCRIPTION OF THE DRAWINGS

Other advantageous details and characteristics of the invention will become apparent hereafter from the description of the examples of embodiment of the invention with reference to FIGS. 1 to 3, which represent.

The figures are not shown to scale in order to simplify understanding thereof.

DESCRIPTION OF A PREFERRED EMBODIMENT

Figure 1:
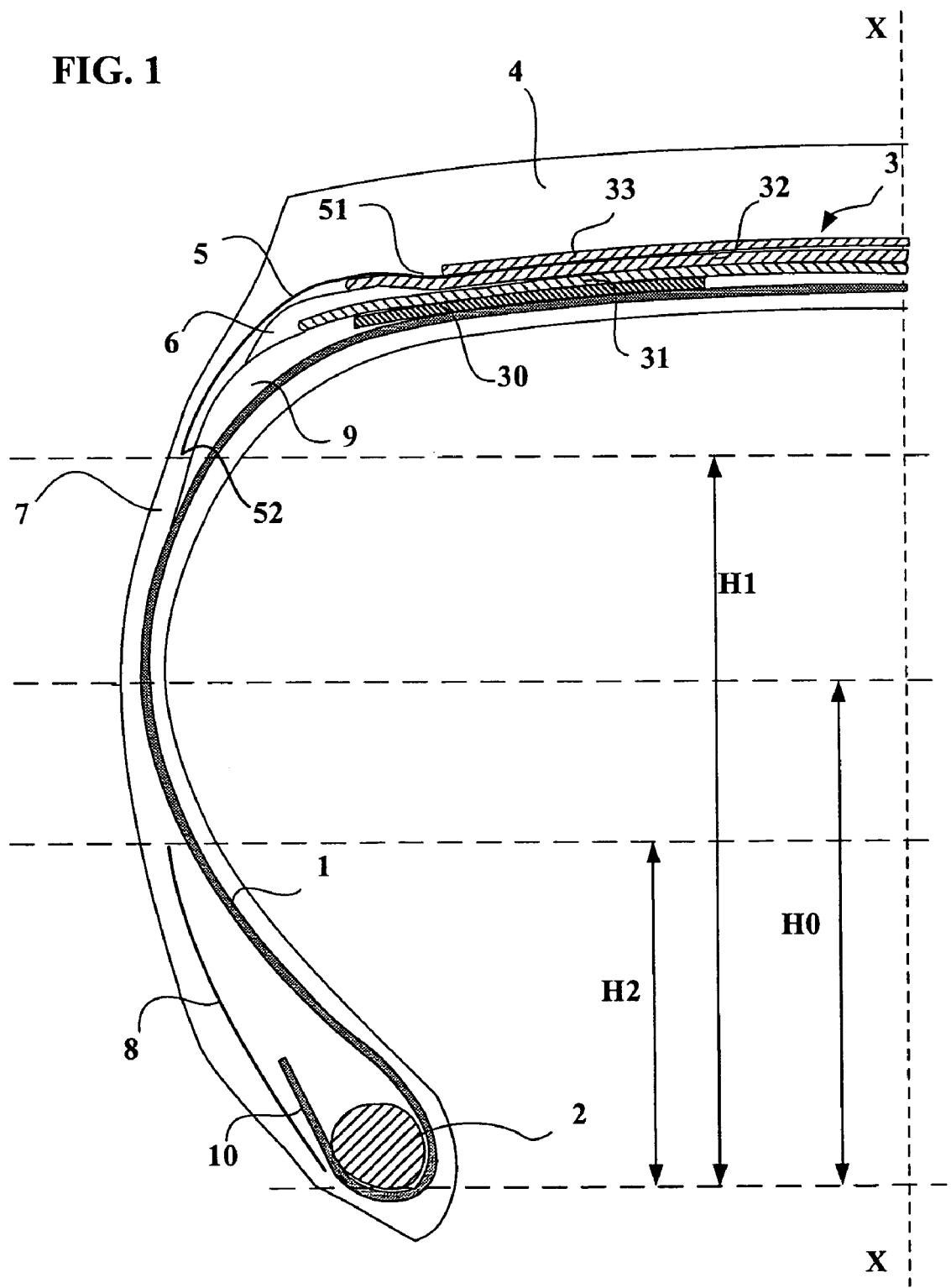
FIG. 1: a meridian view of a diagram of a tire according to the invention.

FIG. 1 illustrates a tire P of dimension 315/80 R 22.5 comprising a radial carcass reinforcement composed of a single ply 1 of inextensible metal cables, that is to say cables having an elongation of at most 0.2% under a tensile force equal to 10% of the breaking load; in the present case they are metal 27×23 cables (27 wires of $^{23}/_{100}$ mm). Said carcass reinforcement is anchored within each bead to a bead wire 2 to form an upturn 10. It is surmounted, radially to the outside, by a crown reinforcement 3, which in turn is surmounted by a tread 4.

The crown reinforcement comprises, radially from the inside towards the outside:
  two half crown plies 30 referred to as triangulation plies and formed of 9×28 metal cables (9 wires of $^{28}/_{100}$), which are oriented at an angle $\alpha_0$, equal to 65° in the case described,
  radially surmounting said plies 30, a first working crown ply 31, formed of 11×35 metal cables (11 wires of $^{35}/_{100}$) forming an angle $\alpha_1$ equal to 26° with the circumferential direction and the compacted diameter D of which is equal to 1.16 mm, the cables of the triangulation plies 30 and of the first working ply 31 having the same direction,
  then a second working crown ply 32 formed of metal cables identical to those of the first ply 31, and forming with the circumferential direction an angle $\alpha_2$, of a direction opposed to the angle $\alpha_1$ and, in the case illustrated, equal to 18°,
  a last, axially continuous, ply 33 formed of metal cables, which are oriented relative to the circumferential direction by an angle $\alpha_3$ of the same direction as the angle $\alpha_2$, and equal in absolute value to said angle $\alpha_2$, this last ply being a so-called protective ply, the so-called elastic E18×23 metal cables being cables having a relative elongation of at least 4% at break; the ends of the working crown plies 31 and 32 are decoupled by a decoupling rubber 6. This decoupling rubber 6 makes it possible, as explained previously, to separate the ends of the reinforcement elements of the ply 31 from those of the ply 32.
  on either side of the equatorial plane XX', there is present an additional ply 5 of 3×18 metal cables (3 wires of $^{18}/_{100}$), and the compacted diameter of which is low and in the case described equal to 0.35 mm. Said cables are parallel to each other within the ply and form with the circumferential direction an angle $\alpha_4$ which is very considerably greater than the angles $\alpha_3$ and $\alpha_2$ formed by the cables of the plies 32 and 33 respectively, since it is equal to 90°.

Figure 2:
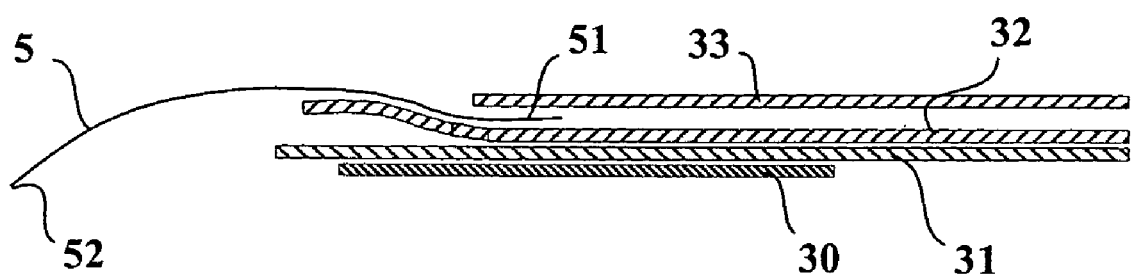
FIG. 2: a diagram of the stack of the different plies incorporating an additional ply according to a first embodiment of the invention corresponding to FIG. 1, FIG. 3: a diagram of the stack of the different plies incorporating an additional ply according to a second embodiment of the invention.

According to the example of embodiment of the invention illustrated in FIGS. 1 and 2, the axially inner edge 51 of the additional shoulder ply 5 is, radially to the outside, adjacent to the edge of the second, radially outermost, working ply 32, and may possibly be inserted between the working ply 32 and the edge of what is called the protective ply 33. As for the radially lower edge 52 of said shoulder ply 5, it is axially arranged on the profiled element 9, or "crown foot", which provides the join between the carcass ply 1 and the edges of the crown plies 30 and 31. In the case described, the radially lower end 52 of the ply 5 is located at a distance $H_1$ from the base of the bead which is equal to $H_0+0.5\ H_0$, which brings said end 52 into the zone of the sidewall 7.

FIG. 1 also illustrates a ply 8 comprising radial reinforcement elements of low diameter placed in the bead zone. This ply 8 makes it possible to evacuate the heat formed in the zone of the bead as a result of the stresses to which the rubber masses are subjected in this zone during travel.

Figure 3:
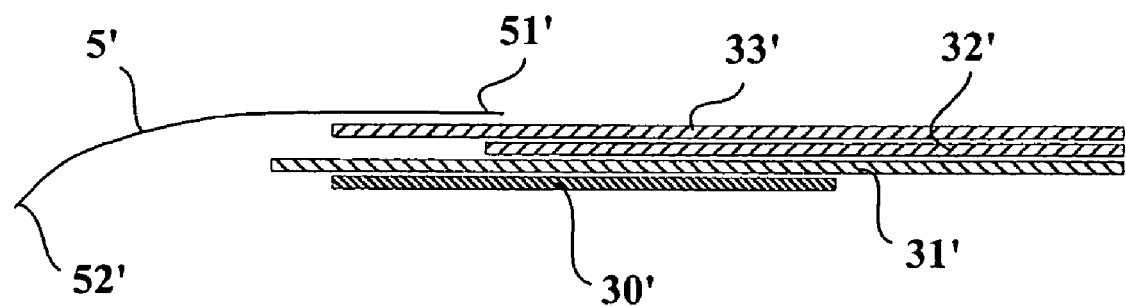

FIG. 3 illustrates a second example of embodiment of the invention in which the tyre has characteristics similar to those of the tire shown in FIG. 1 and differs therefrom in that the radially upper working ply 32' is narrower than the protective ply 33'. The decoupling rubber located at the shoulder is then inserted between the protective ply 33' and the working ply 31'. In this figure, the axially inner edge 51' of the additional shoulder ply 5' is, radially to the outside, adjacent to the edge of the protective ply 33'.

The tire as described above in the case of FIGS. 1 and 2 was compared with a "control" tire, of the same constitution but without additional shoulder plies.

Two types of destructive running tests were carried out:
  the first test consists of a running test on a test drum, in which the tyre is subjected to drift.

The results obtained from this test showed that the tire according to the invention permits a greater mileage before any breaking of the tire is noticed. The tire according to the invention covered 12,500 km, whereas the conventional tire was totally degraded after 6,800 km.
  the second test is similar to the previous one, but with the tire not being subjected to drift but following a path in a straight line. It would appear that, as in the previous test, the tire according to the invention covered a greater mileage: 41,000 km as against 29,000 km for the control tire.

A last test was carried out to demonstrate the contribution which the additional ply according to the invention can make to protecting the shoulders. This test consists of a curb impact, the tire passing fairly abruptly over a curbstone. In the same manner as in the previous tests, tires according to the invention are compared with control tires which are similar in all points but do not have additional shoulder plies.

It turns out that over five tests the control tires were all degraded with a very pronounced break in the structure.

As far as the tires according to the invention were concerned, two were slightly damaged, having only incipient breaks.

The invention claimed is:

1. A tire comprising a carcass reinforcement of at least one ply of reinforcement elements which is anchored within each bead to at least one annular bead element, and a crown reinforcement composed of at least two plies of metallic reinforcement elements, which are parallel to each other within each ply and are crossed from one ply to the next, forming angles of between 10 and 35° with the circumferential direction, wherein it additionally comprises at least in each shoulder of the tire a ply of reinforcement elements, which are parallel to each other in the additional shoulder ply and form an angle with the circumferential direction in the range of 60 to 90°, wherein the axially inner edge of said additional shoulder ply is radially adjacent to at least one edge of one of the plies of the crown reinforcement, and wherein the axially outer edge of said additional shoulder ply is radially internal to the edge of the ply to which the additional shoulder ply is adjacent, wherein the reinforcement elements of the additional shoulder ply have a compacted diameter less than 0.5 times the compacted diameter D of the metallic elements of the working crown plies of said tire, and the reinforcement elements of the additional shoulder ply are metallic.

2. A tire according to claim 1, wherein the reinforcement elements of the additional shoulder ply form an angle in the range of 80° to 90° with the circumferential direction.

3. A tire according to claim 1, wherein the reinforcement elements of the additional shoulder ply have a compacted diameter of less than 1 mm.

4. A tire according to claim 3 wherein the compacted diameter is less than 0.6 mm.

5. A tire according to claim 3 wherein the compacted diameter is less than 0.4 mm.

6. A tire according to claim 1 wherein the reinforcement elements of the additional shoulder ply comprise steel.

7. A tire according to claim 1, wherein the axially outer edge of said additional shoulder ply is distant from the base of the bead by a quantity $H_1$ less than $H_0 + 0.8\ H_0$, $H_0$ being the radial distance separating the line of greatest axial width of the tire from the base of the bead.

8. A tire according to claim 1, wherein the axially inner edge of the additional shoulder ply is radially to the outside and adjacent to the edge of the radially outermost working crown ply.

9. A tire according to claim 1, further comprising a protective crown ply which is radially external to the working crown plies, wherein the axially inner edge of the additional shoulder ply, radially to the outside, is adjacent to the edge of the protective crown ply.

10. A tire according to claim 1, wherein the axially inner edge of the additional shoulder ply is radially to the inside and adjacent to the edge of the radially innermost working crown ply.

11. A tire according to claim 1, further comprising within each bead at least one ply of metallic reinforcement elements which are parallel to each other in the bead ply and oriented radially, and wherein the radially outer edge of said bead ply is located a distance $H_2$ from the base of the bead, which distance is at least equal to 0.5 $H_0$, $H_0$ being the radial distance separating the line of greatest axial width of the tire from the base of the bead.

* * * * *